Feb. 5, 1946.   S. C. GEBERT   2,394,163
SECTIONAL SCREW CONVEYER
Filed June 8, 1944
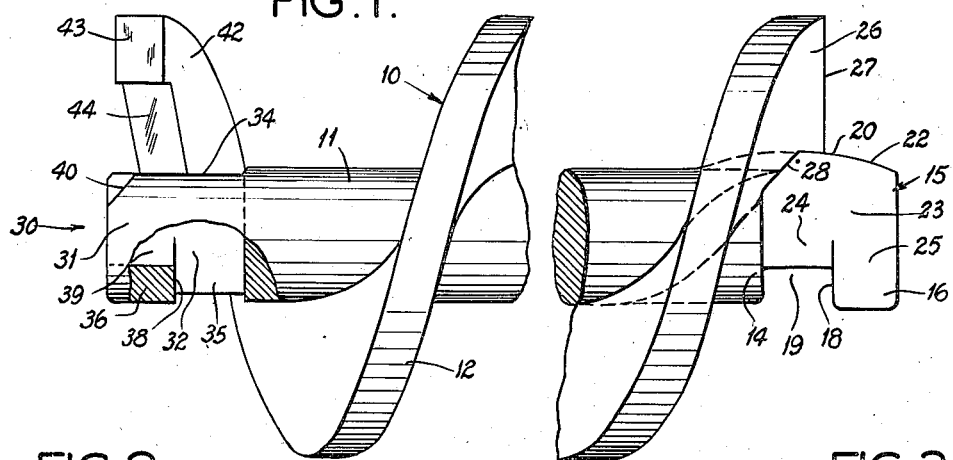
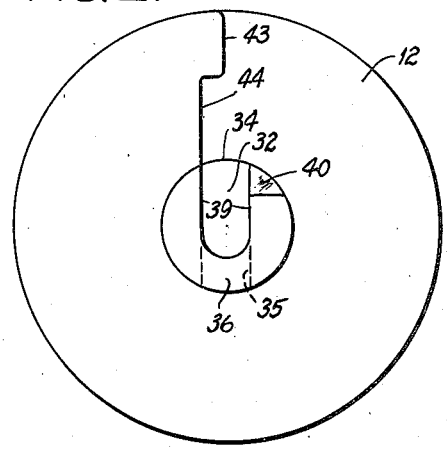
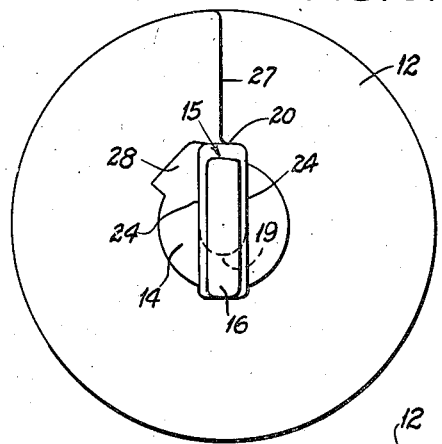
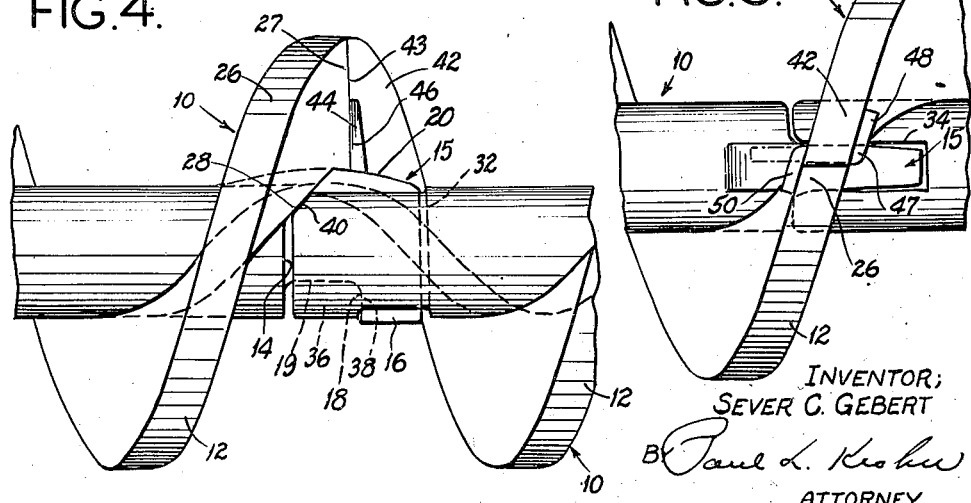
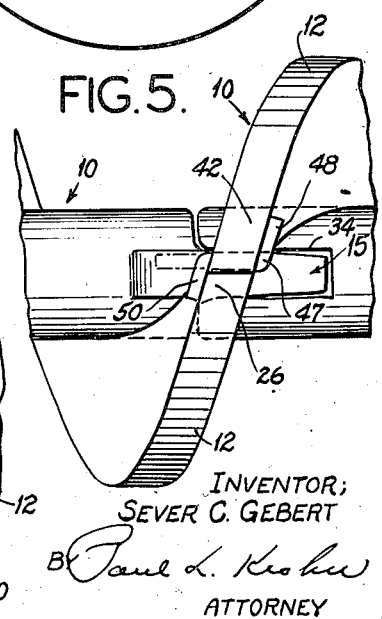
INVENTOR;
SEVER C. GEBERT
BY Paul L. Krohn
ATTORNEY Patented Feb. 5, 1946

2,394,163

UNITED STATES PATENT OFFICE 2,394,163

SECTIONAL SCREW CONVEYER

Sever C. Gebert, Chicago, Ill., assignor to Fairbanks, Morse & Co., Chicago, Ill., a corporation of Illinois Application June 8, 1944, Serial No. 539,279

4 Claims. (Cl. 198—213)

This invention relates generally to material conveying devices of screw or helical flight character, and more particularly to improvements in sectional screw conveyers of a type suitable for use in bin-fed coal stoker assemblies or the like.

The principal object of the present invention resides in the provision of a sectional screw-type conveyer wherein is embodied improved coupling means for uniting the several sections of the conveyer in a manner affording greatly improved and positive operating connections thereof.

Another object is to provide a sectional conveyer wherein the several sections are similar in form and construction, and each is constituted by a unitary structure embodying coupling means as integral parts thereof, whereby each section may be readily and economically produced as a single casting of steel or other suitable material.

Another object is to provide in a conveyer of the character indicated, improved coupling means for each of the conveyer sections, adapted for assembly connection of the sections to permit operation of the conveyer in tension, the coupling means further being so formed and arranged as to offer little or no resistance to the movement of coal or other material by the conveyer.

A further object is to provide for improved coupling of conveyer screw or flight sections in a manner to permit ready and quickly effected disconnection thereof, as for the purpose of repair or replacement of any one or more damaged or worn sections.

Other objects and advantages of the invention will appear readily from the following description of a preferred embodiment thereof, as illustrated by the accompanying drawing, wherein:

Fig. 1 is a view in longitudinal elevation, of a conveyer section embodying the improvements afforded by the present invention, a portion at one end of the shaft thereof, being sectioned to illustrate one part of the shaft coupling provisions;

Fig. 2 is an end elevation of one end of the conveyer, as the left end in Fig. 1;

Fig. 3 is an end elevation of the opposite end thereof;

Fig. 4 illustrates in fragmentary longitudinal elevation, two conveyer sections in coupled assembly, and Fig. 5 is a fragmentary view in longitudinal elevation at the coupling zone, further illustrating features of present improvement.

While the sectional screw conveyer embodying the improved coupling means as herein disclosed and which forms the principal subject of the present invention, has particular utility in connection with coal stokers, and is especially suitable for use in bin-fed stokers, as for the conveyance of coal (through a conduit or the like, in which the conveyer is disposed, according to usual practice) from a bin or other relatively large capacity coal storage zone, either directly to the stoker retort or to a zone of coal transfer to another conveyer leading to the retort, it will be appreciated that the improved conveyer as hereinafter described, may have ready application to systems or apparatus other than coal stokers, wherein material transfer is desired or required.

Referring now to the drawing by appropriate numerals of reference, the sectional conveyer according to the present invention, is comprised of two or more sections each of which is of the presently preferred form and construction illustrated by Figs. 1 to 3. As there shown, the section indicated generally by the numeral 10, includes a shaft 11 and a spiral or helical conveyer flight element 12 arranged thereon. Although the flight element may be formed separately and suitably secured on the shaft as by welding or otherwise, it is presently preferred to provide the shaft and flight as an integral unit, preferably a single steel casting.

Formed integrally of the shaft 11 and projecting longitudinally from one end thereof, as the right hand end 14 (Fig. 1), is a coupling element or hook-like member 15 terminating in a lateral projection or finger-element 16 extending substantially radially of the shaft axis (Fig. 3) the element 16 providing a substantially planar abutment face 18 (for a purpose later to appear) opposed to the shaft end 14 and defining therewith, a notch or generally rectangular recess 19. The longitudinal margin of member 15 opposite the recess 19, is formed to provide a strengthening boss 20 as shown, smoothly merging with the shaft inwardly or rearwardly of the shaft end 14, and inwardly bevelled as at 22, at the free end of the member 15. Further, the opposite side faces 23 of member 15 provide substantially parallel plane surfaces 24 of an extent longitudinally of the member, corresponding substantially to that of the recess 19, and inwardly bevelled surface portions 25 terminating at the outer end of the member.

The right hand end portion 26 (Fig. 1) of the screw or spiral flight element 12, is extended as shown, beyond the shaft end 14, to terminate over the boss 20 of the coupling element 15 in a planar abutment face 27 disposed by present preference, normal to the shaft and substantially in a longitudinal plane through the shaft axis. Flight face 27 as thus provided, affords assembly abutment with a complemental flight face of an adjacent conveyer section, as will appear presently. In extending the flight end over boss 20, a shaft-root portion 28 of the flight, projects in exposed position beyond the shaft end 14 to merge with the boss, as shown by Fig. 3 in particular. The exposed portion 28 thus affords a shoulder which in the present example, is shaped to provide a substantially planar face directed forwardly of the shaft end and at an inclination to the shaft axis, the presently preferred inclination thereof as illustrated, being approximately 45 degrees. The shoulder 28 serves a purpose in the coupling of the sections, which will appear hereinafter.

Turning now to the coupling provisions at the opposite or lefthand end 30 of the conveyer section 10, the shaft end portion 31 is centrally longitudinally recessed or slotted as at 32, with the slot open to the shaft end and open fully at 34, to the shaft periphery. Diametrically opposite the shaft slot side opening 34, the slot is open to the shaft periphery in a zone inwardly of the shaft end, as at 35, being limited in the extent of its opening axially of the shaft, by an abutment element or bridge piece 36 integral with the shaft and spanning the slot 32 therein, inwardly adjacent the shaft periphery at the shaft end (Fig. 2). The bridge piece which constitutes an element of the presently improved coupling means, provides a substantially planar abutment face 38 normal to the shaft axis and located in the slot adjacent the slot opening 35. As indicated in Fig. 2, the side faces 39 of the slot 32 present substantially plane surfaces in general parallelism axially of the shaft end. The shaft end 31 further, has its peripheral end-margin adjacent the slot side opening 34 and on one side only, bevelled at 40 to provide a flat or planar seat for receiving thereagainst in the coupling of the sections, the shoulder 28 on the adjacent conveyer section. Since as presently preferred, the shoulder 28 is inclined at an angle of approximately 45 degrees to the shaft axis, the bevel seat 40 will have a corresponding inclination.

As shown by Figs. 1 and 2, the opposite or lefthand end 42 of the screw flight element 12, terminates in the zone of the slotted shaft end 30, in a planar face 43 adjacent the flight periphery, directed normal to the shaft and in a longitudinal plane through the shaft axis. Below or inwardly of the face 43, the flight end is recessed as at 44, providing an inset face which by preference, is co-planar with one side face 39 of the slot.

Fig. 4 illustrates a pair of conveyer sections each of the form and construction hereinabove described, in operatively connected relation. The hook-like coupling member 15—16 of one section is endwise received in the shaft slot 32 of the other section, being inserted therein such as to dispose the finger element 16 behind the slot bridge or abutment element 36 and through the side opening 35 of the slot, with the bridge element 36 thus occupying the recess 19, whereby the elements are thus positioned for surface engagement between the face 18 of the finger and the face 38 of the bridge piece, upon operation of the conveyer in tension. In forming the shaft slot 32, its transverse dimension or width is restricted to an extent affording only a minimum clearance for permitting ready insertion or removal of the element 15 relative to the slot, and such that in coupling assembly, substantial surface engagement will obtain between the slot faces 39 and the planar, lateral faces 24 of the hook-element 15. Radially beyond the shaft coupling, the contiguous ends of the flight elements of the coupled sections are in abutment, as between the terminal face 27 of the left-hand section and the terminal face 43 of the other section. Inwardly of the flight face 43, the recess 44 in flight end 42, is now closed on its otherwise open sides (Figs. 1 and 2) by the adjacent or opposed surface portion of the flight face 27 and the underlying surface portion of the peripheral boss 20, both on the left-hand conveyer section, thus to define a slot 46 for receiving therethrough, a key or locking element 47 (Fig. 5). As indicated in Fig. 5, the element 47 having its mid-section closely received in the slot, is formed initially with one end portion 48 turned outwardly so as to engage or lie against the adjacent marginal or side face of the flight end 42, upon seating of the element in slot 46. The opposite end portion 50 of the element, which projects initially as indicated by the broken line showing thereof, is in suitable manner, turned oppositely into engagement with the adjacent side face of the flight end 26. The key element as thus disposed, serves to bring the abutting flight ends into alignment and to maintain such alignment in conveyer operation. Moreover, in effecting the foregoing, a slight relative axial displacement of the coupled sections will occur, such as to effect positive face abutment of the coacting finger element 16 and slot bridge piece 36. Thus the key 47 effectively locks the conveyer sections in coupled assembly, so as to preclude relative axial displacement of the coupling and flight elements, and further prevents relative displacement of the elements transversely of the shaft axis, through engagement of the key mid-section (in slot 46) with the outer end of the slot (being the end thereof underlying the flight face 43), and with the boss 20 (Fig. 4) defining the inner end of the slot. It is to be noted also, that in the coupled sections wherein the abutment element 36 is closely received in the recess 19 and in engagement with the overlying margin of the coupling element 15, a relatively true axial alignment of the shafts obtains, and that such alignment is effectively maintained by the key 47 in engagement with the coupling boss 20.

It now will appear that in the conveyer sections connected by the improved coupling means as herein described, the axial coupling load occurring from operation of the sections in tension, is applied at the abutting coupling elements 16 and 36, these elements according to the present improvements, being in engagement in a zone inwardly of the shaft periphery and hence, relatively near the axis of the connected shafts. Moreover, the rotary driving connection of the sections as afforded by the coupling provisions, is such as to distribute the torsional load between substantially radially spaced zones of the coupling, as in part at the engaging side faces 39 and 23 of the shaft slot 32 and shaft element 15 respectively, and in part at the abutting faces 27 and 43 of the contiguous flight ends, the latter being appreciably radially beyond the shaft axis. Upon completely coupled engagement of the sections, the inclined shoulder 28 at the base of the flight end portion 26, normally will rest on the inclined seat 40 on shaft end 31, so that relative axial displacement of the sections tending to disengage the finger 16 and bridge 36, is thus precluded.

Except for the key element 47, the presently improved coupling provisions for a sectional conveyer, are provided as integral parts of each conveyer section, thereby avoiding many of the disadvantages found in earlier prevailing couplings, such as those affording pinned or bolted connection of flight sections. By reason of the present improvements, each section may be readily produced by a single steel casting, characterized in completed form, by great strength particularly in the zones of the coupling elements thereof, and by a materially increased operating life. It is to be noted especially, in connection with the foregoing, that the shearing stresses in the zone of the shaft coupling, are reduced to a marked extent by distribution of the torque load between the abutting flights and the shaft coupling, and additionally by the provision of substantial surface contact of the shaft coupling faces 23 and 39.

It will be observed from Figs. 4 and 5 illustrating sections in coupled assembly, that the coupling means affords close-coupling of the shaft elements and a relation of the flights such as to effect a continuous or unbroken spiral or helical extent thereof through the coupling zone, so that resistance to smooth and efficient movement of coal or other material by the sectional conveyer, is thereby reduced to a minimum or substantially avoided. Moreover, and as will be now appreciated, any one or more of the sections may be readily and quickly disconnected, as for repair or replacement, upon removal of the appropriate key elements 47.

Although the invention has been fully described in application to but a single, presently preferred embodiment thereof, as illustrated by the accompanying drawing, it is to be understood that modifications in parts and relative arrangement thereof may be made without departing from the spirit and full intended scope of the invention as defined by the appended claims.

I claim:

1. In a sectional conveyer, conveyer sections each including a shaft, a coupling member on one end of the shaft and terminating in a lateral projection, said member and projection being formed so as to be substantially within the peripheral confines of the shaft, the opposite shaft end providing a longitudinal recess therein, having an opening extending substantially radially to the shaft periphery in a zone inwardly of the shaft end, a helical flight element on said shaft, extending to the zones of said coupling member and shaft recess, the ends of the flight element terminating in planar faces in a longitudinal plane through the shaft axis, and one of said ends having a recess in the planar face thereof, said sections in coupled assembly, having the coupling member of one section received in the shaft recess of the next adjacent section in relatively close lateral confinement therein and with said lateral projection of the coupling member in and through said recess opening, and having the planar faces at the contiguous ends of the flight elements thereof, in substantial surface abutment, and a strip-like element extending through said recess in the planar face of said one of said flight ends, and overlapping the contiguous ends of the flight elements, serving to maintain the flight ends in alignment and the sections in coupled assembly.

2. A conveyer of the character described, comprising conveyer sections each including a shaft and a helical flight thereon, a shaft end of one section being substantially axially recessed and providing a recess opening extending substantially radially to the shaft periphery and located inwardly of the shaft end, the adjacent shaft end of the next adjacent section being formed to provide a coupling member having a terminal projection thereon, with the member and projection so formed as to be substantially within the peripheral confines of the shaft, said coupling member being received in said shaft end recess in relatively close lateral confinement therein and with the terminal projection disposed in and through said recess opening, the contiguous flight ends of the adjacent sections being in end-abutment, one of said contiguous ends providing an end-recess therein, and a strip-like member arranged through said flight end-recess and having its ends deformed into lateral clamping engagement with opposite surfaces of the contiguous flight ends, effective to maintain the contiguous flight ends in alignment and the adjacent sections in coupled assembly.

3. In a sectional conveyer, conveyer sections each including a shaft and a helical flight thereon, said shaft at one end, including a coupling member having a lateral terminal projection thereon, formed so as to be substantially within the peripheral confines of the shaft, the opposite shaft end being provided with a substantially axial recess having an opening extending substantially radially to the shaft periphery and located inwardly of the shaft end, said opposite shaft end further being formed to provide an inclined end-surface at one side of said recess, said flight at one end, extending over said coupling member and terminating in a planar face normal to the shaft, said flight end providing an inclined shoulder near said shaft coupling member, the opposite flight end extending to the zone of said shaft recess and terminating in a planar face normal to the shaft, said sections in coupled assembly, having the coupling member of one section received in the shaft recess of the next adjacent section, in relatively close lateral confinement therein and with the terminal projection thereof in and through said recess opening, and said inclined shoulder substantially in engagement with said inclined end-surface, and having the planar faces of the contiguous flight ends in substantial abutment.

4. In a sectional conveyer, conveyer sections each including a shaft and a helical flight thereon, said shaft at one end, including a coupling member having a lateral terminal projection thereon, formed so as to be substantially within the peripheral confines of the shaft, the opposite shaft end being provided with a substantially axial recess having an opening extending substantially radially to the shaft periphery and located inwardly of the shaft end, said opposite shaft end further being formed to provide an inclined end-surface at one side of said recess, said flight at one end, extending over said coupling member and terminating in a planar face normal to the shaft, said flight end providing an inclined shoulder near said shaft coupling member, the opposite flight end extending to the zone of said shaft recess and terminating in a planar face normal to the shaft, said sections in coupled assembly, having the coupling member of one section received in the shaft recess of the next adjacent section, in relatively close lateral confinement therein and with the terminal projection thereof in and through said recess opening, and said inclined shoulder substantially in engagement with said inclined end-surface, and having the planar faces of the contiguous flight ends in substantial abutment, and means in the zone of said contiguous flight ends, adapted for maintaining the flight ends in alignment and the sections in coupled assembly.

SEVER C. GEBERT.